United States Patent
Chen et al.

(10) Patent No.: US 11,320,926 B2
(45) Date of Patent: May 3, 2022

(54) KEY SETTING METHOD AND DEVICE, AND STORAGE MEDIUM

(71) Applicant: Beijing Xiaomi Mobile Software Co., Ltd., Beijing (CN)

(72) Inventors: Yu Chen, Beijing (CN); Changyu Sun, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/793,919

(22) Filed: Feb. 18, 2020

(65) Prior Publication Data

US 2021/0081068 A1 Mar. 18, 2021

(30) Foreign Application Priority Data

Sep. 12, 2019 (CN) .......................... 201910862910.3

(51) Int. Cl.
| | |
|---|---|
| *G06F 3/041* | (2006.01) |
| *G06F 3/045* | (2006.01) |
| *G06F 3/0481* | (2022.01) |
| *H04B 1/3827* | (2015.01) |

(52) U.S. Cl.
CPC .......... *G06F 3/0416* (2013.01); *G06F 3/0414* (2013.01); *G06F 3/0481* (2013.01); *G06F 2203/04104* (2013.01); *H04B 1/3833* (2013.01)

(58) Field of Classification Search
CPC ............................. G06F 3/0416; G06F 3/044
See application file for complete search history.

(56) References Cited

U.S. PATENT DOCUMENTS

| | | | | |
|---|---|---|---|---|
| 2010/0085317 | A1* | 4/2010 | Park | G06F 3/04817 |
| | | | | 345/173 |
| 2016/0170559 | A1* | 6/2016 | Zeng | G06F 3/0346 |
| | | | | 345/173 |
| 2016/0291928 | A1 | 10/2016 | Lee et al. | |
| 2017/0034446 | A1* | 2/2017 | Park | H04N 5/23219 |

(Continued)

FOREIGN PATENT DOCUMENTS

| | | |
|---|---|---|
| CN | 101968710 A | 2/2011 |
| CN | 104503698 A | 4/2015 |

(Continued)

OTHER PUBLICATIONS

Extended European Search Report in European Application No. 20161751.1, dated Sep. 21, 2020.

(Continued)

*Primary Examiner* — Nan-Ying Yang
(74) *Attorney, Agent, or Firm* — Finnegan, Henderson, Farabow, Garrett & Dunner, L.L.P.

(57) ABSTRACT

A key setting method is performed by a terminal, wherein a pressure sensing area is provided on at least one side of the terminal with respect to a screen display region, and the method includes: detecting a grip posture of a user gripping the terminal by using a touch sensor distributed on a surface of the terminal; determining a key setting mode corresponding to the grip posture, wherein the key setting mode indicates a key function corresponding to a target side of the at least one side; and in the pressure sensing area on the target side, setting a pressure sensing key corresponding to the key function.

15 Claims, 9 Drawing Sheets

(56) References Cited

U.S. PATENT DOCUMENTS

2017/0336899 A1* 11/2017 Szeto .................. G06F 3/04142
2017/0357440 A1    12/2017 Tse
2018/0300004 A1* 10/2018 Kugler ................ G06F 3/04142
2019/0018588 A1     1/2019 DeBates et al.
2019/0235703 A1     8/2019 Yin et al.

FOREIGN PATENT DOCUMENTS

| CN | 107831999 A | 3/2018 |
| CN | 108089828 A | 5/2018 |
| CN | 108897472 A | 11/2018 |
| EP | 2 175 344 A2 | 4/2010 |
| JP | 2013-003248 A | 1/2013 |
| KR | 20100038791 A | 4/2010 |
| KR | 20100039194 A | 4/2010 |
| KR | 20100121183 A | 11/2010 |
| KR | 20160001610 A | 1/2016 |
| KR | 10-2018-0017388 A | 2/2018 |
| WO | WO 2019/017153 A1 | 1/2019 |

OTHER PUBLICATIONS

International Search Report in Application No. PCT/CN2019/120797, dated May 27, 2020.
English version of International Search Report from the China National Intellectual Property Administration in corresponding International Application No. PCT/CN2019/120797, dated May 27, 2020.
Notification of Reason for Refusal dated Jun. 29, 2021, from the Korean Patent Office issued in counterpart Korean Application No. 10-2019-7038787.
Office Action dated Nov. 16, 2021, from the State Intellectual Property Office of People's Republic of China issued in counterpart Chinese Application No. 201910862910.3.
Notice of Reasons for Refusal dated Jan. 4, 2022, from the Japanese Patent Office issued in counterpart Japanese Application No. 2020-501782.
Notification of Reason for Refusal dated Jan. 24, 2022, from the Korean Intellectual Property Office issued in counterpart Korean Application No. 10-2019-7038787.

* cited by examiner

KEY SETTING METHOD AND DEVICE, AND STORAGE MEDIUM

CROSS-REFERENCE TO RELATED APPLICATION

This application is based upon and claims priority to Chinese Patent Application No. 201910862910.3, filed on Sep. 12, 2019, the entire content thereof is incorporated herein by reference.

TECHNICAL FIELD

The present disclosure relates to terminal control technologies, and in particular, to a key setting method, a key setting device, and a storage medium.

BACKGROUND

With the development of mobile terminal technologies, handheld terminals with large screens, such as smartphones, tablets, or e-book readers, are becoming more and more popular.

In order to facilitate user operations, sides of a terminal with respect to the display screen usually have one or more buttons or keys with specific functions. The positions and functions of the side keys can be different for different manufacturers or models of terminals. For example, in related technologies, the left side of a terminal can be provided with a volume key, and the right side can be provided with a power key. Alternatively, the left side of another terminal can be provided with a power key, and the right side can be provided with a volume key. As another example, a power key and a volume key can be provided on one side of a terminal, and no buttons or keys are provided on the other side.

SUMMARY

According to a first aspect of embodiments of the present disclosure, there is provided a key setting method. The method is performed by a terminal, and a pressure sensing area is provided on at least one side of the terminal with respect to a screen display region. The method includes: detecting a grip posture of a user gripping the terminal by using a touch sensor distributed on a surface of the terminal; determining a key setting mode corresponding to the grip posture, wherein the key setting mode indicates a key function corresponding to a target side of the at least one side; and setting a pressure sensing key corresponding to the key function in the pressure sensing area on the target side.

According to a second aspect of embodiments of the present disclosure, there is provided a key mode setting device. The device is applied in a terminal, and a pressure sensing area is provided on at least one side of the terminal with respect to a screen display region. The device includes: a processor; and a memory for storing instructions executable by the processor; wherein the processor is configured to: detect a grip posture of a user gripping the terminal by using a touch sensor distributed on a surface of the terminal; determine a key setting mode corresponding to the grip posture, wherein the key setting mode indicates a key function corresponding to a target side of the at least one side; and set, in the pressure sensing area on the target side, a pressure sensing key corresponding to the key function.

According to a third aspect of embodiments of the present disclosure, there is provided a computer-readable storage medium having stored therein instructions that, when executed by a processor in a terminal, cause the terminal to perform the key setting method according to the first aspect.

The technical solutions provided by the embodiments of the present disclosure may have the following beneficial effects.

By using a touch sensor distributed on the surface of the terminal to detect a user's grip posture for gripping the terminal, a key setting mode corresponding to the grip posture is determined. The key setting mode indicates a key function corresponding to a target side among at least one side. In the pressure sensing area on the target side, a pressure sensing key corresponding to the key function is set. In this way, depending on different grip postures of the user, the terminal can set keys with different functions on the sides with respect to the screen display region, thereby automatically switching the functional keys on the sides of the terminal, extending the setting mode of the keys on the sides of the terminal, and improving the ease of operation of the keys on the sides of the terminal.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The present disclosure provides apparatuses and methods that can automatically set functional keys in a side of a terminal relative to a screen display region according to a grip posture when a user grips the terminal. In some embodiments, the apparatuses and methods may customize functions or positions of the keys on the sides of the terminal based on the pressure sensing area set on the side(s) of the terminal.

Figure 1:
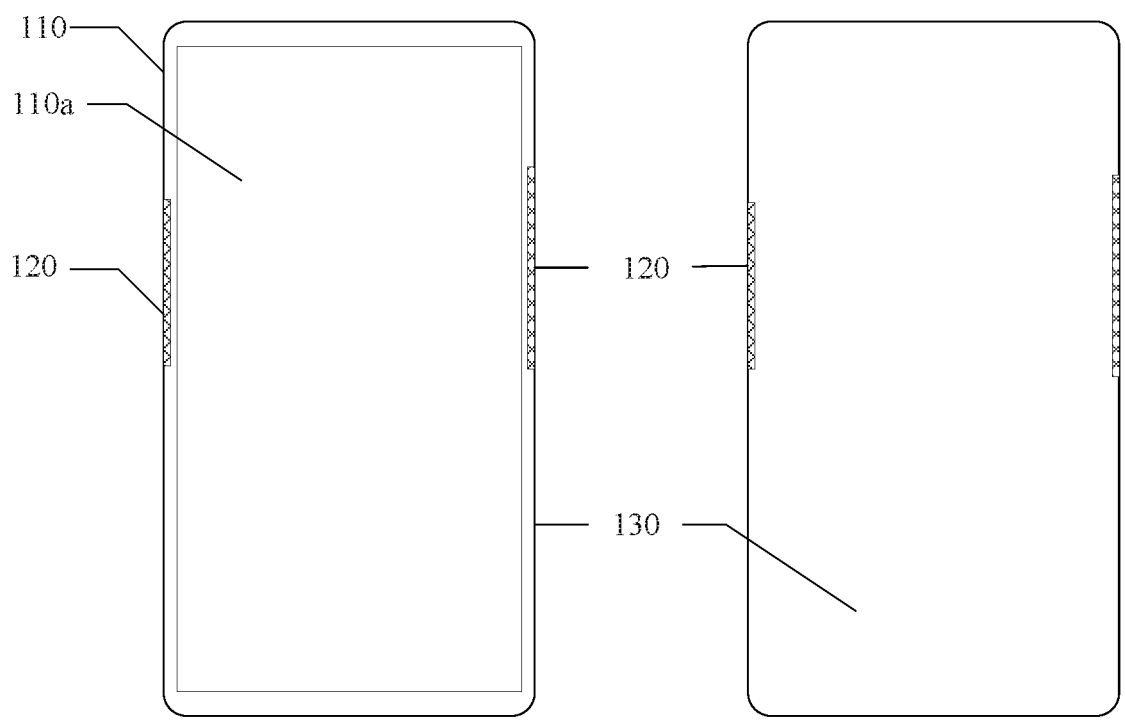
FIG. 1 is a schematic diagram of a terminal according to an exemplary embodiment.

FIG. 1 is a schematic diagram of a terminal according to an exemplary embodiment. The terminal may be a smart phone, a tablet computer, an e-book reader, or the like. As shown in FIG. 1, the terminal includes a display screen 110, a pressure sensing area 120, and a touch sensor 130.

As shown in the left part of FIG. 1, the display screen 110 on the front of the terminal includes a screen display region 110a.

The display screen 110 may include a display screen provided on the front of the terminal. For example, the display screen may include a full screen or a non-full screen on the front of the terminal. The full screen refers to a type of display in which the screen ratio in the terminal is close to 100%.

In some embodiments, the display screen 110 may further include a display screen disposed on the back of the terminal.

For example, in an embodiment, the display screen provided on the front of the terminal is the main display screen, and the display screen provided on the back of the terminal is the secondary display screen. The size of the main display screen may be greater than or equal to the size of the secondary display screen. For example, the main display screen may be a full screen, and the secondary display screen may be a non-full screen. Also for example, the main display screen and the secondary display screen may both be full screens or non-full screen screens.

In an embodiment, when the display screen 110 includes the display screens disposed on the front and back of the terminal, the main display screen and the secondary display screen may not be fixed, but may be changed according to the actual usage of the user. For example, the display screen on the side facing the user can be set as the main display screen, and the display screen on the other side may be set as the secondary display screen.

The display screen 110 may also be a foldable screen. In an embodiment, the two display regions in the foldable screen are respectively disposed on different housings, and the two housings are connected by a folding mechanism, such as a hinge. When the two housings are bent by the folding mechanism, the two display regions in the foldable screen can be folded. Generally, a part or all of the area of the foldable screen is a flexible screen. For example, the part of the foldable screen corresponding to the folding mechanism is a flexible screen.

According to the orientation of the folded screen, the foldable screen can be divided into an inward foldable screen and an outward foldable screen. The inward foldable screen may be a foldable screen which faces inward after being folded; the outward foldable screen may be a foldable screen which faces outward after being folded. In some embodiments of the present disclosure, the foldable screen is the outward foldable screen which faces outward after being folded.

Depending on different folding directions, the outward foldable screen can be divided into left and right outward foldable screens, upper and lower outward foldable screens, and outward double foldable screens.

For the left and right outward foldable screen, the screen is left-right folded, the folding line is in the middle of the screen, and at least one of the left and right surfaces after being folded is used as the display region.

For the upper and lower outward foldable screen, the screen is upper-lower folded, the folding line is in the middle of the screen, and at least one of the upper and lower surfaces after being folded is used as the display region.

For the outward double foldable screens, the folding of the left and right sides of the screen toward the middle along different folding lines, and the size of the left and right folded areas is consistent with the size of the remaining screen area in the middle.

The screen display region 110a is a full or partial display region in the display screen 110.

For example, when the display screen 110 is a full screen or a non-full screen, or the display screen 110 is a foldable screen and is in an unfolded state, the screen display region 110a may be all the display region in the display screen 110.

Also for example, when the display screen 110 is an outward foldable screen and is in a folded state, the screen display region 110a may be a display region facing a certain direction in the display screen 110, for example, a display region facing the direction of the user's face after being folded.

The pressure sensing area 120 is provided on at least one side of the terminal with respect to the screen display region 110a.

The pressure sensing region 120 is a region for detecting a pressure on the outer surface. For example, the pressure sensing area 120 may be an area where a pressure sensor is disposed under the outer surface of the terminal. The pressure sensor is a device or apparatus that can sense the pressure signal and convert the pressure signal into a usable output electrical signal according to a certain rule.

The at least one side may be at least one of left and right side surfaces and upper and lower side surfaces of the terminal with respect to the screen display region 110a.

The screen display region 110a may be an area that is being displayed on the display screen 110. The sides of the terminal with respect to the screen display region 110a may be surfaces of the terminal that are perpendicular to the surface on which the screen display region 110a is located. For example, the side of the screen display region 110a in the terminal is the front side of the terminal, and any one of the four sides of the front side, i.e., the upper side, the lower side, the left side and the right side, can be provided with the pressure sensing area 120.

For example, in the terminal shown in FIG. 1, the pressure sensing area 120 is provided on a left side and a right side with respect to the screen display region 110a. In another embodiment, the pressure sensing area 120 may be disposed on one of the left side and the right side with respect to the screen display region 110a, or the pressure sensing area 120 may also be disposed on the left side, the right side, and the upper side with respect to the screen display region 110a. As to which sides the pressure sensing area 120 is disposed with respect to the screen display region 110a, embodiments of the present do not impose specific limitations on this.

The pressure sensing area 120 may be provided in a part of the area on the side where the pressure sensing area 120 is located, or the pressure sensing area 120 may also be provided in the entire area on the side where the pressure sensing area 120 is located.

For example, when the terminal is a full-screen terminal, a non-full-screen terminal, or a foldable screen terminal in a unfolded state, all or part of the areas on the left and right sides of the display of the terminal may be the pressure sensing area 120.

When the terminal is an outward foldable screen terminal, all or part of the folding area in the foldable screen of the terminal may be provided with a pressure sensor. When the terminal is in a folded state, the side where the folding area is located is referred to as the sides with respect to the screen display region 110*a*, the area where the pressure sensor is disposed on the side may be the pressure sensing area 120 described above.

The above-mentioned touch sensor 130 may be distributed in various positions in the terminal except the screen display region 110*a*. For example, the touch sensor 130 may be distributed in a position of the terminal that a user may grip, such as a side and a back of the terminal with respect to the screen display region 110*a*. For example, as shown in FIG. 1, the touch sensors 130 are distributed on the back and the side of the terminal.

For example, the touch sensor 130 may be provided in the display screen of the terminal, that is, the touch operation is detected through the display screen. For example, when the terminal is provided with a display screen on both the front and the back, or when the terminal is a foldable screen terminal and the screen is in a folded state, the display region on the opposite side of the surface where the current screen display region 110*a* is located in the terminal can be regarded as the area where the touch sensor 130 is located, that is, the display screen other than the screen display region 110*a* may implement the function of the touch sensor 130.

In some embodiments, the touch sensor 130 may be provided outside the display screen, that is, a touch sensor is additionally provided in an area other than the display screen of the terminal. For example, when the terminal is a full-screen terminal, and the back of the full-screen terminal does not include the screen or the screen area on the back is small, the touch sensor 130 may be additionally provided on an area of the sides or the back of the terminal that does not include a display screen.

The types of the touch sensor 130 may be classified into a resistive type, a capacitive type, an electromagnetic type, a surface acoustic wave (SAW) type, an infrared type, and the like.

The methods described in the following embodiments may be based on the terminal illustrated in connection with FIG. 1, and customized setting of the keys on the sides of the terminal may be realized depending on the user's grip posture when gripping the terminal.

Figure 2:
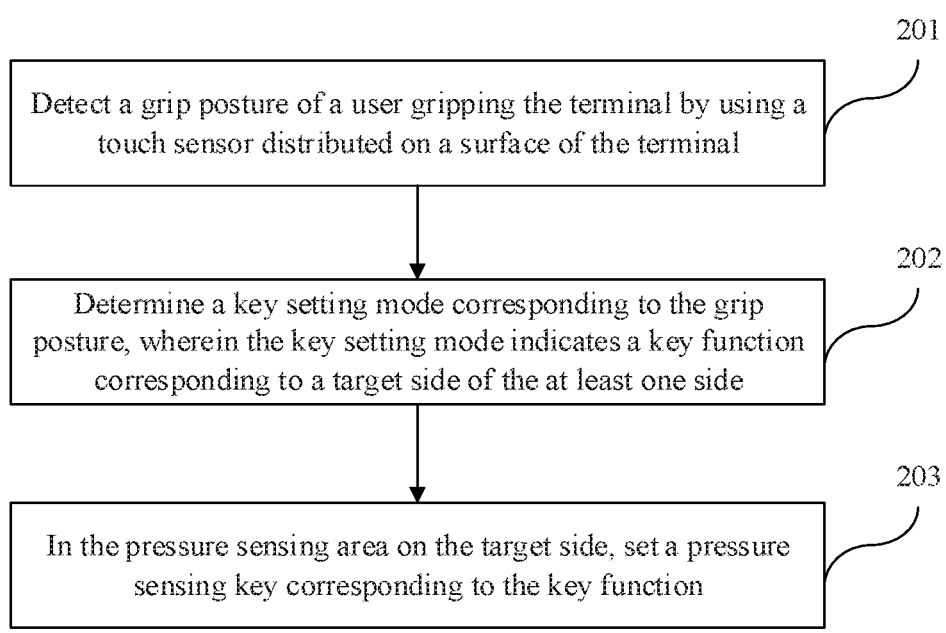
FIG. 2 is a flow chart of a key setting method according to an exemplary embodiment.

FIG. 2 is a flow chart of a key setting method according to an exemplary embodiment. The key setting method may be performed by a terminal. A pressure sensing area is provided on at least one side of the terminal with respect to a screen display region. For example, the terminal may be a terminal shown in FIG. 1. As shown in FIG. 2, the key setting method may include the following steps.

In step 201, a grip posture of a user gripping the terminal is detected by using a touch sensor distributed on a surface of the terminal.

In step 202, a key setting mode corresponding to the grip posture is determined. The key setting mode indicates a key function corresponding to a target side of the at least one side.

In step 203, in the pressure sensing area on the target side, a pressure sensing key corresponding to the key function is set.

In some embodiments, setting a pressure sensing key corresponding to the key function in the pressure sensing area on the target side includes: obtaining a key position of the pressure sensing key corresponding to the key function; and according to the key position, setting the pressure sensing key in the pressure sensing area on the target side.

In some embodiments, obtaining a key position of the pressure sensing key corresponding to the key function on the target side includes: obtaining the key position of the pressure sensing key corresponding to the key function on the target side as indicated by the key setting mode; or obtaining a grip region when the terminal is gripped, and determining the key position of the pressure sensing key corresponding to the key function on the target side according to a position of the grip region.

In some embodiments, before determining the key setting mode corresponding to the grip posture, the method further includes: displaying a function setting interface corresponding to the key setting mode; and according to a function selection operation performed on the function setting interface, setting the key function corresponding to the target side.

In some embodiments, determining a key setting mode corresponding to the grip posture includes: determining an application program running in a foreground in the terminal; and determining the key setting mode according to the application program running in the foreground and the grip posture.

In some embodiments, detecting a grip posture of a user gripping the terminal by using a touch sensor distributed on a surface of the terminal includes: obtaining a grip region when the terminal is gripped; and obtaining the grip posture according to the grip region.

In some embodiments, obtaining the grip posture according to the grip region includes: searching for a grip region template matching the grip region; and obtaining the grip posture corresponding to the grip region template; wherein the grip posture includes a left-hand grip posture, a right-hand grip posture, or a two-hand grip posture.

In some embodiments, the grip region includes at least one touch region on a left side and at least one touch region on a right side, the left side is a side of the terminal located on the left of the screen display region, and the right side is a side of the terminal located on the right of the screen display region; wherein obtaining the grip posture according to the grip region includes: comparing a number of at least one touch region on the left side with a number of at least one touch region on the right side; if the number of at least one touch region on the left side is smaller than the number of at least one touch region on the right side, obtaining the grip posture as the left-hand grip posture; and if the number of the at least one touch region on the right side is smaller than or equal to the number of the at least one touch region on the left side, obtaining the grip posture as the right-hand grip posture.

In some embodiments, the display screen of the terminal is a foldable screen including two main display regions, and when the display screen is in a folded state, the two main display regions face outward of the terminal along different directions respectively; wherein before detecting a grip posture of a user gripping the terminal by using a touch sensor distributed on a surface of the terminal, the method further includes: obtaining touch regions respectively detected in the two main display regions when the display screen is in the folded state; and determining one of the two main display regions as the screen display region according to the touch regions respectively detected in the two main display regions.

In the key setting method according to embodiments of the present disclosure, by using a touch sensor distributed on the surface of the terminal to detect a user's grip posture for gripping the terminal, a key setting mode corresponding to the grip posture is determined. The key setting mode indicates a key function corresponding to a target side among at least one side. In the pressure sensing area on the target side, a pressure sensing key corresponding to the key function is set. In this way, depending on different grip postures of the user, the terminal can set keys with different functions on the sides with respect to the screen display region, thereby automatically switching the functional keys on the sides of the terminal, extending the setting mode of the keys on the sides of the terminal, and making operation of the keys on the sides of the terminal easy.

Figure 3:
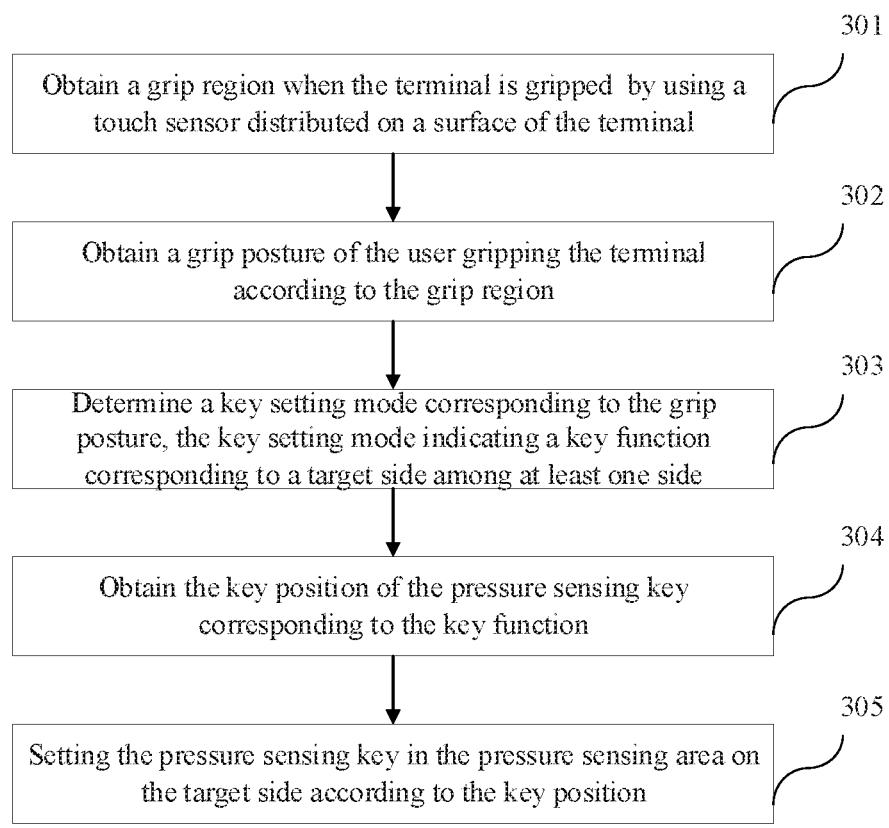
FIG. 3 is a flow chart of a key setting method according to another exemplary embodiment.

FIG. 3 is a flow chart of a key setting method according to another exemplary embodiment. The key setting method may be performed by a terminal, and a pressure sensing area is provided on at least one side of the terminal with respect to a screen display region. For example, the terminal may be the terminal shown in FIG. 1. As shown in FIG. 3, the key setting method may include the following steps.

In step 301, a grip region when the terminal is gripped is obtained by using a touch sensor distributed on a surface of the terminal.

In embodiments of the present disclosure, touch sensor(s) distributed on a surface of the terminal can collect sensor data in real time and send the sensor data to a processor, and the processor determines the grip region when the terminal is gripped according to the sensor data from the pressure sensor.

For example, the processor may determine the touch region in the terminal by using the sensor data of the touch sensor, and determine the detected touch region as the grip region when the terminal is gripped.

Figure 9:
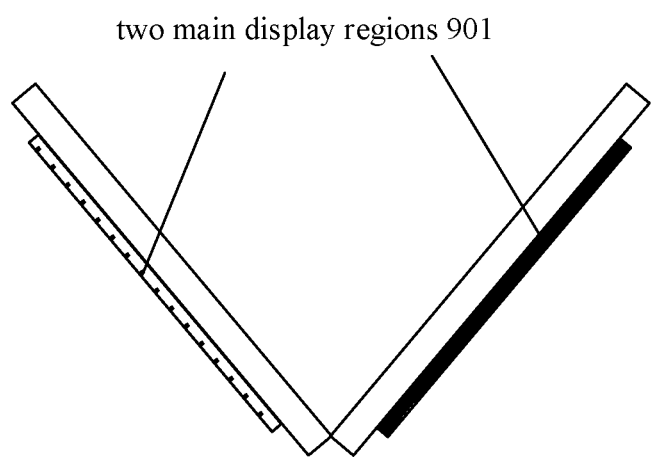

In some embodiments, shown in FIG. 9, if the display screen of the terminal includes two main display regions 901, and the two main display regions 901 face outward of the terminal along different directions outside the terminal, the terminal also obtains touch regions detected in the two main display regions 901; and one of the two main display regions 901 is determined as the screen display region according to the touch regions detected in the two main display regions 901, respectively.

When the terminal includes two main display regions, and the user cannot see the contents displayed in the two main display regions at the same time, the terminal can automatically select one of the main display regions as the screen display region according to the user's touch region and display the interface in the screen display region.

For example, the terminal may determine a main display region with a relatively small detected touch region in the two main display regions as the screen display region.

Further, in order to improve the accuracy of the screen display region and reduce erroneous detection, in embodiments of the present disclosure, the terminal may further determine the screen display region in combination with other conditions. For example, the terminal may obtain the areas of the touch regions respectively detected in the two main display regions. When the area of the touch region detected in the first main display region is greater than a first area threshold while the area of the touch region detected in the second main display region is smaller than a second area threshold, the second main display region may be determined as the screen display region, wherein the first area threshold is greater than the second area threshold.

For example, when the terminal is a terminal with a display screen on the front and back respectively, the terminal may determine the area (referred to as a first area) of the touch region detected on the front display screen, and the area (referred to as a second area) of the touch region detected on the back display screen. For example, when the first area is smaller than 1 $cm^2$ and the second area is greater than 3 $cm^2$, the terminal sets the entire region of the front display screen as the screen display region and displays the interface display in this front display screen.

For another example, when the terminal is a terminal with an outward foldable screen and the terminal is in a folded state, the display region in the foldable screen is divided into two main display regions. The two main display regions face opposite directions. According to the grip region when the user grips the terminal, the terminal may determine the area (assuming the area as a third area) of the touch region detected on the main display region 1, and the area (assuming the area as a fourth area) of the touch region detected on the other main display region 2. For example, when the third area is smaller than 1 $cm^2$ and the fourth area is greater than 3 $cm^2$, the terminal sets the main display region 1 as a screen display region, and displays the interface in the main display region 1.

In step 302, a grip posture of the user gripping the terminal is obtained according to the grip region.

The manner of acquiring the grip posture of the user gripping the terminal according to the grip region may include, but is not limited to, the following two methods.

In the first method, a grip region template matching the grip region is searched for, and the grip posture corresponding to the grip region template is obtained.

The grip posture corresponding to the grip region template includes a left-hand grip posture, a right-hand grip posture, or a two-hand grip posture, or the like.

The grip region template may be a template for indicating a position of the grip region and an area of the grip region. The terminal stores the following three grip region templates (but embodiments of the present disclosure are not limited to the three templates): a left-hand grip template, a right-hand grip template, or a two-hand grip template. In addition, each of the grip region templates may include at least one grip region template corresponding to a grip posture. The grip posture corresponding to the left-hand grip template is a left-hand grip posture; the grip posture corresponding to the right-hand grip template is a right-hand grip posture; and the grip posture corresponding to the two-hand grip template is a two-hand grip posture.

When the processor in the terminal obtains the grip region when the terminal is gripped, it can match the grip region with various grip region templates to obtain the matching degrees between the grip region and the various grip region templates. When the matching degree between the obtained grip region and a target grip region template is greater than a preset matching degree threshold (for example, 90%), it can be determined that the user's grip posture for gripping the terminal is the grip posture corresponding to the target grip region template.

In the embodiments, in order to eliminate the situation where the user temporarily changes the grip posture, the processor in the terminal may continuously detect the matching degree between the grip region and the target grip region template when determining the grip posture. If the matching degree between the grip region and the target grip region template is continuously greater than the preset matching degree threshold within a preset length of time, then it can be determined that the user's grip posture for gripping the terminal is the grip posture corresponding to the target grip region template.

In the second method, the grip region includes at least one touch area on a left side and at least one touch area on a right side, the left side is a side of the terminal located on the left of the screen display area, and the right side is a side of the terminal located on the right of the screen display area. A number of at least one touch area on the left side is compared with a number of at least one touch area on the right side; if the number of at least one touch area on the left side is smaller than the number of at least one touch area on the right side, the grip posture is determined as the left-hand grip posture; and if the number of the at least one touch area on the right side is smaller than or equal to the number of the at least one touch area on the left side, the grip posture is determined as the right-hand grip posture.

In another embodiment, the terminal may also directly determine the grip posture by determining the condition of the touch region. For example, when the screen display region is facing the user, if the user grips the terminal with his left hand, the left thumb will contact the left side of the terminal, and three or four of the other fingers of the left hand will contact the right side of the terminal. Otherwise, if the user grips the terminal with his right hand, the user's right thumb will contact the right side of the terminal, and three or four of the other fingers of the right hand will contact the left side of the terminal. Similarly, if the user grips the terminal with both hands, the left palm of the user will contact the left side of the terminal, and the right palm of the user will touch the right side of the terminal. Based on the above principle, when the terminal detects that the touch region on the left side of the screen display region in the terminal is smaller than the touch region on the right side of the screen display region, it can be determined that the grip gesture is a left-hand grip gesture. Conversely, when the terminal detects that the touch region on the left side of the screen display region is larger than the touch region on the right side of the screen display region, it can be determined that the grip gesture is a right-handed grip gesture. Similarly, when the terminal detects that the touch region on the left side of the screen display region is equal to the touch region on the right side of the screen display region of the terminal, it can be determined that the grip gesture is a grip gesture with both hands.

In step 303, a key setting mode corresponding to the grip posture is determined. The key setting mode indicates a key function corresponding to a target side among at least one side.

In embodiments of the present disclosure, the terminal may set key setting modes corresponding to various grip postures in advance. After the terminal determines the user's current grip posture for gripping the terminal, the terminal may search the key setting modes corresponding to the determined grip posture.

The target sides corresponding to different key setting modes may be different, and different key setting modes may have different key functions on the same side.

For example, in the key setting mode corresponding to the left-hand grip gesture, the target side can include the left side and the right side relative to the screen display region, and the key settings can be as follows: keys from top to bottom in turn on the left side can be the volume control keys and power key, and the keys from top to bottom in turn on the right side can be the AI key or other custom functional keys.

In the key setting mode corresponding to the right-hand grip posture, the target side can include the left side and the right side relative to the screen display region, and the key setting can be as follows: keys from top to bottom in turn on the right side can be the volume control keys and power key, and the keys from top to bottom in turn on the left side can be the AI key or other custom functional keys.

In some embodiments, in the key setting mode corresponding to the two-hand grip posture, the target side may include the left side, the right side, and the upper side relative to the screen display region, and the key settings may be as follows: keys on the right side can be the volume control keys, the key on the left side can be the bright control key, and the keys on the upper side can be the AI key or other custom functional keys.

The key setting modes corresponding to the above-mentioned various grip postures can be set in the terminal in advance by a developer.

In some embodiments, the key setting modes corresponding to the above various grip gestures can also be customized or changed in the terminal by the user.

For example, before determining the key setting mode corresponding to the grip posture, the terminal may also display a function setting interface corresponding to the key setting mode; according to a function selection operation performed in the function setting interface, the key function corresponding to the target side is set.

Figure 4:
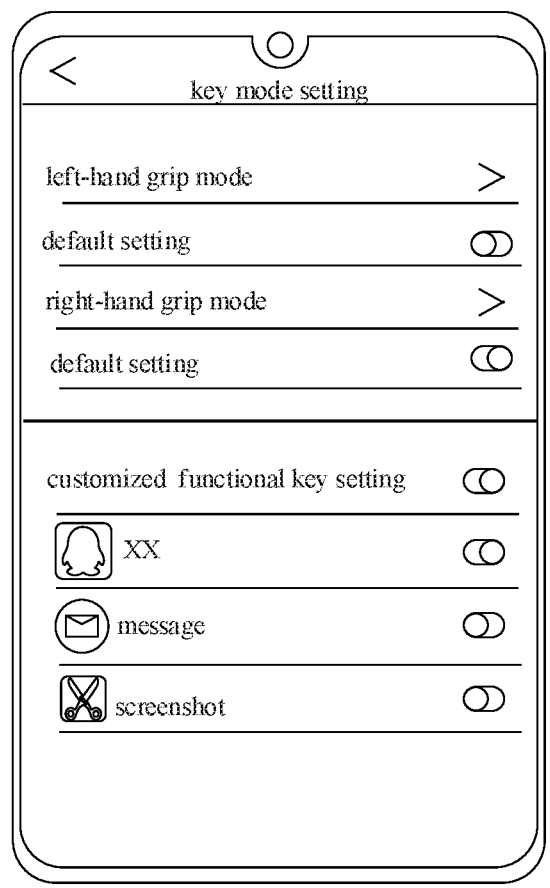
FIG. 4 is a schematic diagram of a setting interface according to an exemplary embodiment.

FIG. 4 is a schematic diagram of a setting interface according to an exemplary embodiment of the present disclosure. As shown in FIG. 4, the key function setting may include two parts. The first part relates to whether to set the left-hand grip mode or the right-hand grip mode as the default setting. By setting the left-hand grip mode or the right-hand grip mode as the default setting, the volume adjustment keys and the power key modules and the customized functional key modules are located on which side of the screen display region of the terminal can be determined. The default setting of the left-hand grip mode can be that the volume adjustment keys and power key modules are on the left side of the screen display region, and the customized functional key modules are on the right side of the screen display region. The default setting of the right-hand grip mode is the opposite of the default setting of the left-hand grip mode. The second part relates to the specific setting of the functions of the customized functional keys, including opening a specified software or performing an operation on the terminal, such as taking a screenshot of the terminal screen.

In an embodiment, when determining the key setting mode corresponding to the grip gesture, the terminal may determine an application program running in the foreground of the terminal; and according to the application program running in the foreground and the grip gesture, the terminal may determine the key setting mode.

For example, when a user uses chat social software in the terminal, it may be unavoidable that single-handed operability is usually not available. In order to improve the operability of single-handed use of chat social software, this problem can be solved by setting a customized functional key in conjunction with the software's universal voice sending function. For example, when the application program running in the foreground of the terminal is an application program other than the chat social software and the touch sensor detects the grip posture as a right-hand grip posture, the key setting mode can be determined as follows: volume adjustment keys are set on the right side relative to the screen display region, and a customized functional key is set on the left side relative to the screen display region. When the terminal determines that the application program running in the foreground of the terminal is the chat social software and the touch sensor detects the grip gesture as a right-handed grip posture, the key setting mode can be as follows: a selection key is set on the right side relative to the screen display region to select contacts, and a voice sending key is set on the left side relative to the screen display region, and long pressing the key can send voice messages.

For another example, a user uses game software on a terminal. Traditional game operations are performed on the display screen. When the user grips the terminal with both hands, most users can only operate with the thumbs of both hands. In the embodiments provided by embodiments of the present disclosure, in order to improve the operability of the game, operation functions can be set on the customized functional keys on the sides. For example, when the terminal determines that the application program running in the foreground of the terminal is game software and the touch sensor detects the grip gesture as a two-hand grip posture, the key setting mode can be as follows: a skill release key is set on the left side relative to the upper side of the screen display region, and a normal attack key is set on the right side relative to the upper side of the screen display region.

For another example, when a user uses video playback software on the terminal, the screen lock function is usually used to prevent the video from being played forward or back by inadvertent touches. In the existing technologies, if the terminal is locked, the brightness cannot be adjusted. In order to improve operability, the brightness adjustment function can be set by using a customized functional key on a side. For example, when the terminal determines that the application program running in the foreground of the terminal is video play software and the touch sensor detects the grip gesture as a two-hand grip posture, the key setting mode can as follows: the brightness adjustment key is on the left side relative to the upper side of the screen display region, and the volume adjustment keys are set on the right side relative to the upper side of the screen display region.

The left side, the right side, and upper side and so on in the embodiments of the present disclosure may be determined based on the display direction of the screen display region. For example, the side above the images displayed in the screen display region is the upper side, and the side corresponding to the left of the images is the left side, and so on.

Referring back to FIG. 3, in step 304, the key position of the pressure sensing key corresponding to the key function is obtained.

The obtained key position may be a position of the pressure sensing key in the target side.

After the processor in the terminal obtains the key function indicated by the key setting mode, it can further obtain the key position of the corresponding key function on the target side.

In the embodiment, the manner of obtaining the key position of the pressure sensing key corresponding to the key function in the target side may include, but is not limited to, the following two manners:

In the first manner, the key position of the pressure sensing key corresponding to the key function on the target side as indicated by the key setting mode is obtained.

In some embodiments, the position of the functional key on the target side as indicated by each key setting mode may be fixed.

In an embodiment, key positions corresponding to individual key functions are defined in various key setting modes, and the terminal may directly obtain a key position corresponding to each key function from the determined key setting mode.

For example, the left side and the right side of the terminal with respect to the screen display region each contain 5 key positions. Taking the key setting mode corresponding to the left-hand grip gesture as an example, the key setting mode indicates that the functional keys on the left side relative to the screen display region are the volume control keys and the power key, the functional keys on the right side are the AI key and the custom functional keys. In addition, the key setting mode also defines that the position of the volume up key is the first key position on the left side of the screen display region, the position of the volume down key is the second key position on the left side of the screen display region, the position of the power key is the third key position on the left side of the screen display region, the position of the AI key is the first key position on the right side of the screen display region, and the position of the customized functional key is the second key position on the right side of the screen display region. The terminal can directly obtain the key positions of the functional keys on the left and right sides of the screen display region of the terminal directly from the key setting mode.

In an embodiment, the terminal may obtain a corresponding key position of each key function according to an arrangement order of each key function on the target side indicated by the key setting mode.

For example, the left side and the right side of the terminal with respect to the screen display region each contain 5 key positions. Taking the key setting mode corresponding to the left-hand grip gesture as an example, the key setting mode indicates that the order of the functional keys on the left side with respect to the screen display region is: the volume control keys and the power key, and the order of the functional keys on the right side with respect to the screen display region is: the AI key and the customized functional key. According to the order of the above key functions, the terminal can determine the position of the volume up key as the first key position on the left side of the screen display region, determine the position of the volume down key as the second key position on the left side of the screen display region, determine the position of the power key as the third key position on the left side of the screen display region, determine the position of the AI key as the first key position on the right side of the screen display region, and determine the position of the customized functional key as the second key position on the right side of the screen display region.

In the second manner, the grip region when the terminal is gripped is obtained, the position of the pressure sensing key corresponding to the key function in the target side is determined according to the position of the grip region.

In embodiments of the present disclosure, the positions of the functional keys indicated by each key setting mode in the target side may not be fixed.

For example, the left side and the right side of the terminal with respect to the screen display region each contain 5 key positions. Taking the key setting mode corresponding to the left-hand grip gesture as an example, the key setting mode indicates that the functional keys on the left side with respect to the screen display region are the volume control keys and the power key. The terminal can obtain the touch position of the grip region on the left side, and determine three key positions closest to the touch position among the 5 key positions on the left side, and determine the three key positions from top to bottom as the key positions of the volume up key, the volume down key, and the power key, respectively.

In step 305, the pressure sensing key is set in the pressure sensing area on the target side according to the key position.

After the processor in the terminal obtains each key function on the target side and the position corresponding to each key function on the target side, the processor can set pressure sensing keys corresponding to the key functions at the obtained key positions. When a pressing operation performed on one of the pressure sensing keys is detected, for example, it is detected that the pressure at the pressure sensing key is greater than a preset pressure threshold, a corresponding function and operation can be triggered.

Figure 5:
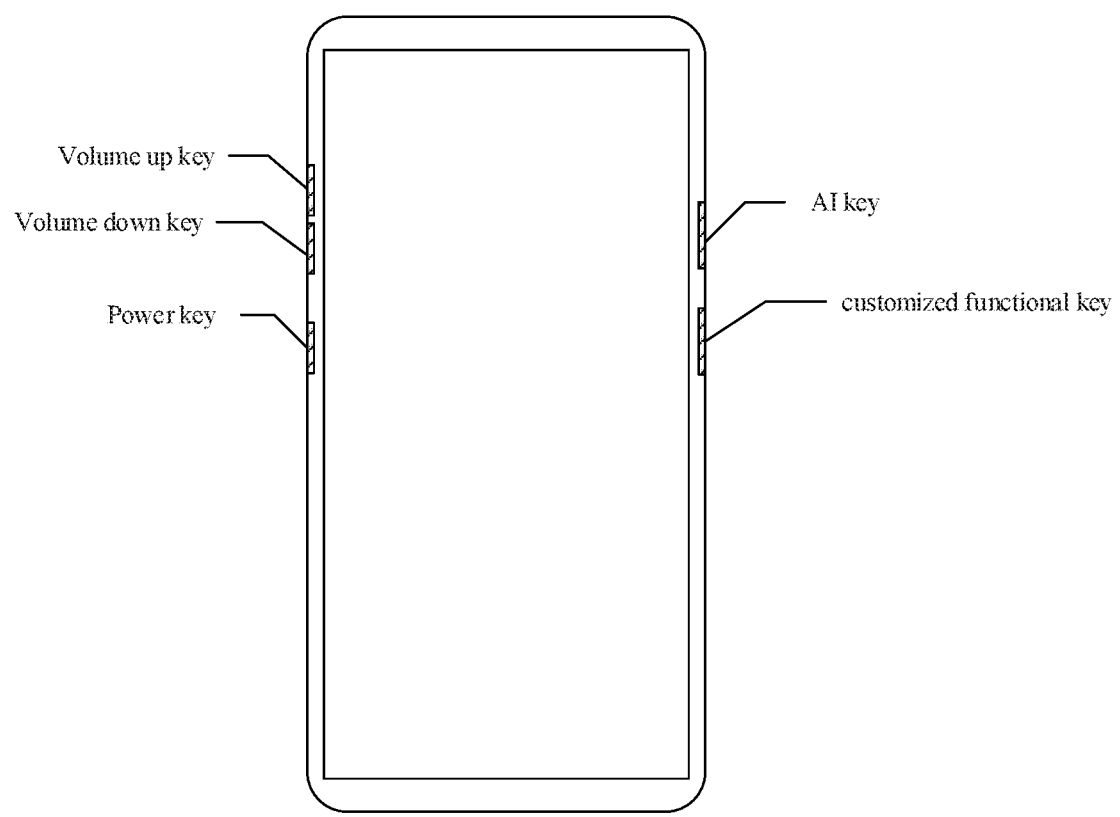
FIG. 5 is a schematic diagram showing key function settings in a left-hand grip mode according to an exemplary embodiment.
Figure 6:
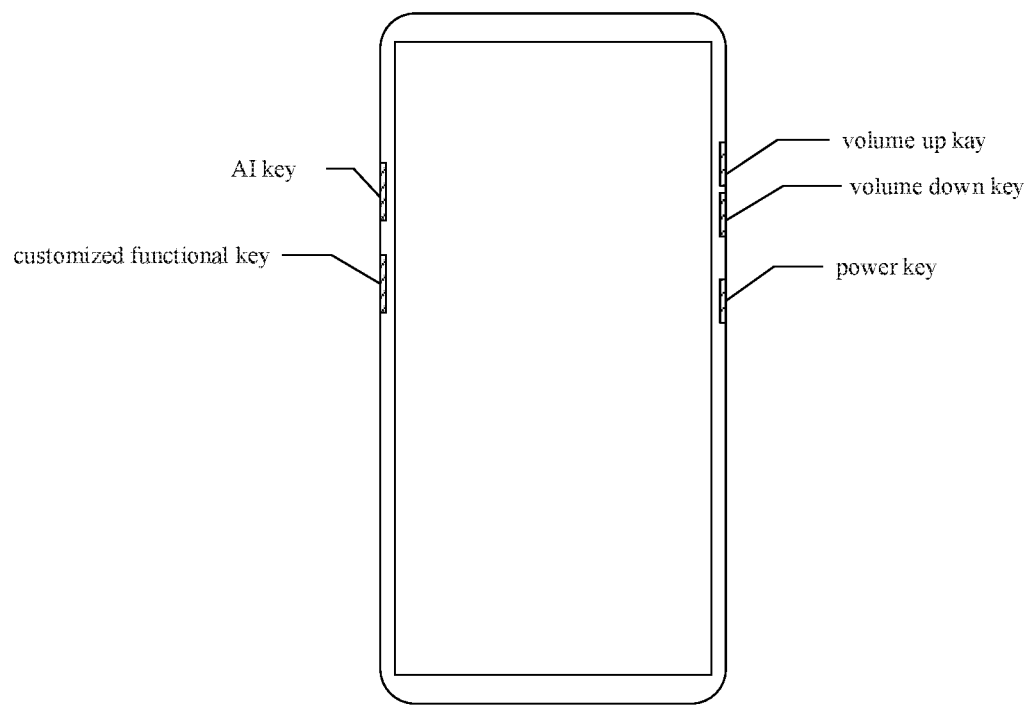
FIG. 6 is a schematic diagram showing key function settings in a right-hand grip mode according to an exemplary embodiment.

For example, FIG. 5 is a schematic diagram showing key function settings in a left-hand grip mode according to an embodiment of the present disclosure. As shown in FIG. 5, the order of the functional keys on the left side of the screen display region is: the volume control keys and the power key, and the order of the functional keys on the right side of the screen display region is: the AI key and the customized functional key. When a user holds the terminal (e.g., a mobile phone) with the user's left hand, a sensor detects that the thumb is measured on the left side of the terminal (the area is smaller) and the other fingers are on the right side of the terminal (the area is larger). Accordingly, in some embodiments, general-purpose input/output (GPIO) of the keys may be defined based on the key arrangement in FIG. 5. FIG. 6 is a schematic diagram showing key function settings in a right-hand grip mode according to an embodiment of the present disclosure. As shown in FIG. 6, the order of the functional keys on the right side of the screen display region is: the volume control keys and the power key, and the order of the functional keys on the left side of the screen display region is: the AI key and the customized functional key. When the user holds the terminal with the user's right hand, the thumb is on the right side of the terminal and the other fingers are on the left side of the terminal. Accordingly, in some embodiments, the GPIO may be defined based on the key arrangement in FIG. 6. FIGS. 5 and 6 show that when there is switching between the left-hand grip mode and the right-hand grip mode, the key functions on the two sides of the terminal are different.

In the key setting methods according to embodiments of the present disclosure, by using a touch sensor distributed on the surface of the terminal to detect a user's grip posture for gripping the terminal, a key setting mode corresponding to the grip posture is determined. The key setting mode indicates a key function corresponding to a target side among at least one side of the terminal. In the pressure sensing area on the target side, a pressure sensing key corresponding to the key function is set. In this way, depending on different grip postures of the user, the terminal can set keys with different functions on the sides with respect to the screen display region, thereby automatically switching the functional keys on the sides of the terminal, extending the setting mode of the keys on the sides of the terminal, and improving the ease of operation of the keys on the sides of the terminal.

Figure 7:
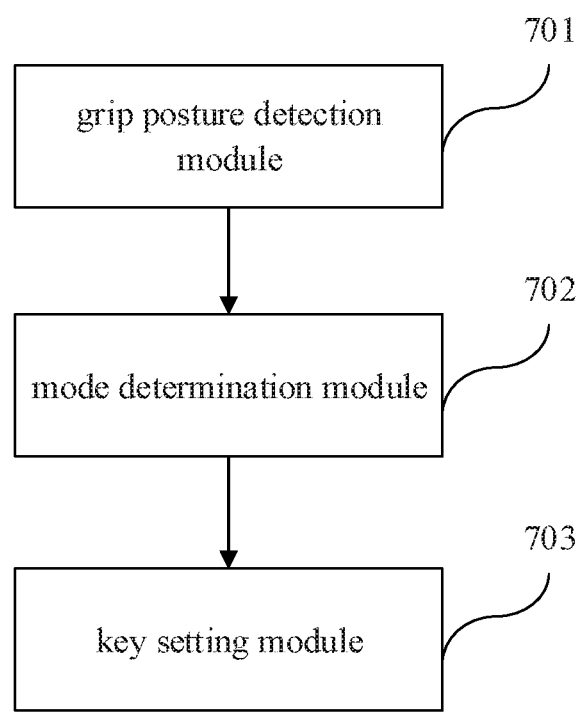
FIG. 7 is a block diagram of a key setting device according to an exemplary embodiment.

FIG. 7 is a block diagram of a key setting device according to an exemplary embodiment. As shown in FIG. 7, the key setting device may be implemented as all or part of a terminal through hardware, or software, or a combination of hardware or software. A pressure sensing area is provided on at least one side of the terminal with respect to a screen display region. The key setting device may include a grip posture detection module 701, a mode determination module 702, and a key setting module 703.

The grip posture detection module 701 is configured to detect a grip posture of a user gripping the terminal by using a touch sensor distributed on a surface of the terminal.

The mode determination module 702 is configured to determine a key setting mode corresponding to the grip posture, wherein the key setting mode indicates a key function corresponding to a target side of the at least one side.

The key setting module 703 is configured to, in the pressure sensing area on the target side, set a pressure sensing key corresponding to the key function.

In some embodiments, the key setting module 703 includes: a key position obtaining sub-module configured to obtain a key position of the pressure sensing key corresponding to the key function; and a key setting sub-module configured to, according to the key position, set the pressure sensing key in the pressure sensing area on the target side.

In some embodiments, the key position obtaining sub-module is configured to: obtain the key position of the pressure sensing key corresponding to the key function on the target side as indicated by the key setting mode; or obtain a grip region when the terminal is gripped, and determine the key position of the pressure sensing key corresponding to the key function on the target side according to a position of the grip region.

In some embodiments, the device further includes: an interface display module configured to, before the mode determination module 702 determines the key setting mode corresponding to the grip posture, display a function setting interface corresponding to the key setting mode; and a function module configured to, according to a function selection operation performed on the function setting interface, set the key function corresponding to the target side.

In some embodiments, the mode determination module 702 includes: a program determination sub-module configured to determine an application program running in a foreground in the terminal; and a mode determination sub-module configured to determine the key setting mode according to the application program running in the foreground and the grip posture.

In some embodiments, the grip posture detection module 701 includes: a grip region obtaining sub-module configured to obtain a grip region when the terminal is gripped; and a posture determination sub-module configured to obtain the grip posture according to the grip region.

In some embodiments, the posture determination sub-module is configured to: search for a grip region template matching the grip region; and obtain the grip posture corresponding to the grip region template; wherein the grip posture includes a left-hand grip posture, a right-hand grip posture, or a two-hand grip posture.

In some embodiments, the grip region includes at least one touch region on a left side and at least one touch region on a right side, the left side is a side of the terminal located on the left of the screen display region, and the right side is a side of the terminal located on the right of the screen display region; wherein the posture determination sub-module is configured to: compare a number of at least one touch region on the left side with a number of at least one touch region on the right side; if the number of at least one touch region on the left side is smaller than the number of at least one touch region on the right side, obtain the grip posture as the left-hand grip posture; and if the number of the at least one touch region on the right side is smaller than or equal to the number of the at least one touch region on the left side, obtain the grip posture as the right-hand grip posture.

In some embodiments, a display screen of the terminal includes two main display regions, and the two main display regions face outward of the terminal along different directions respectively; wherein the terminal further includes: a touch region obtaining module configured to, before the grip posture detection module detects the grip posture of the user gripping the terminal by using the touch sensor distributed on the surface of the terminal, obtain touch regions respectively detected in the two main display regions; and a display region determination module configured to determine one of the two main display regions as the screen display region according to the touch regions respectively detected in the two main display regions.

It should be noted that division of functional modules in the device is only an example, and in practical applications, the above functions may be allocated to different functional modules according to actual needs. The device may be divided into different functional modules to complete all or part of the functions described above.

The specific manner of the operation of each module in the device has been described in detail in the method embodiments, and will not be repeated here.

An exemplary embodiment of the present disclosure provides a key setting device. The key setting device can execute steps in any of the embodiments described with reference to FIGS. 2 and 3. A pressure sensing area is provided on at least one side of the terminal with respect to a screen display region. The key setting device includes a processor and a memory for storing instructions executable by the processor. The processor is configured to: detect a grip posture of a user gripping the terminal by using a touch sensor distributed on a surface of the terminal; determine a key setting mode corresponding to the grip posture, wherein the key setting mode indicates a key function corresponding to a target side of the at least one side; and in the pressure sensing area on the target side, set a pressure sensing key corresponding to the key function.

In some embodiments, setting a pressure sensing key corresponding to the key function in the pressure sensing area on the target side includes: obtaining a key position of the pressure sensing key corresponding to the key function; and according to the key position, setting the pressure sensing key in the pressure sensing area on the target side.

In some embodiments, obtaining a key position of the pressure sensing key corresponding to the key function on the target side includes: obtaining the key position of the pressure sensing key corresponding to the key function on the target side as indicated by the key setting mode; or obtaining a grip region when the terminal is gripped, and determining the key position of the pressure sensing key corresponding to the key function on the target side according to a position of the grip region.

In some embodiments, before determining the key setting mode corresponding to the grip posture, the processor is further configured to: display a function setting interface corresponding to the key setting mode; and according to a function selection operation performed on the function setting interface, set the key function corresponding to the target side.

In some embodiments, determining a key setting mode corresponding to the grip posture includes: determining an application program running in a foreground in the terminal; and determining the key setting mode according to the application program running in the foreground and the grip posture.

In some embodiments, detecting a grip posture of a user gripping the terminal by using a touch sensor distributed on a surface of the terminal includes: obtaining a grip region when the terminal is gripped; and obtaining the grip posture according to the grip region.

In some embodiments, obtaining the grip posture according to the grip region includes: searching for a grip region template matching the grip region; and obtaining the grip posture corresponding to the grip region template; wherein the grip posture includes a left-hand grip posture, a right-hand grip posture, or a two-hand grip posture.

In some embodiments, the grip region includes at least one touch region on a left side and at least one touch region on a right side, the left side is a side of the terminal located on the left of the screen display region, and the right side is a side of the terminal located on the right of the screen display region; wherein obtaining the grip posture according to the grip region includes: comparing a number of at least one touch region on the left side with a number of at least one touch region on the right side; if the number of at least one touch region on the left side is smaller than the number of at least one touch region on the right side, obtaining the grip posture as the left-hand grip posture; and if the number of the at least one touch region on the right side is smaller than or equal to the number of the at least one touch region on the left side, obtaining the grip posture as the right-hand grip posture.

In some embodiments, a display screen of the terminal includes two main display regions, and the two main display regions face outward of the terminal along different directions respectively; wherein before detecting a grip posture of a user gripping the terminal by using a touch sensor distributed on a surface of the terminal, the processor is further configured to: obtain touch regions respectively detected in the two main display regions; and determine one of the two main display regions as the screen display region according to the touch regions respectively detected in the two main display regions.

Figure 8:
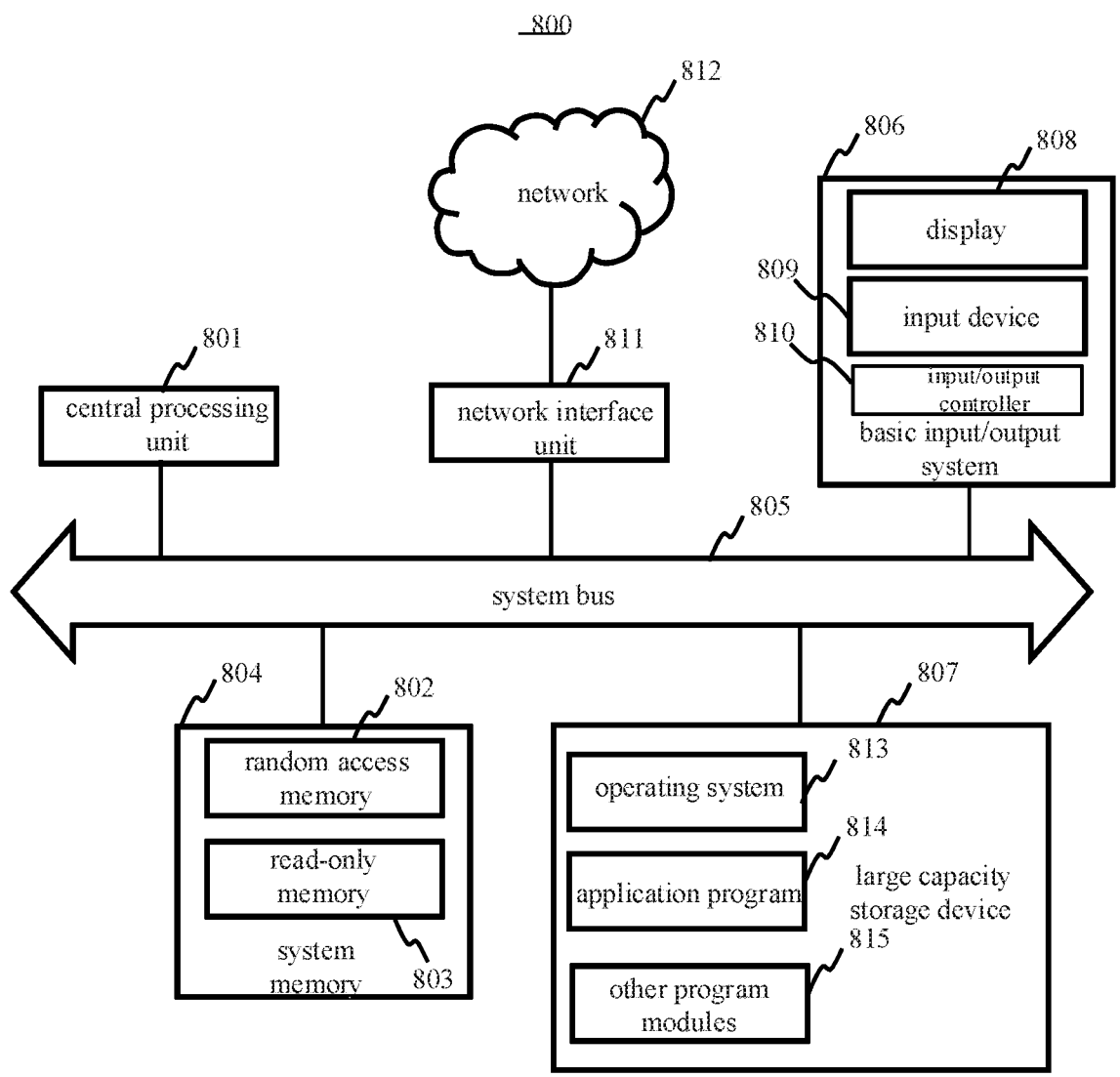
FIG. 8 and FIG. 9 are schematic diagrams of a device according to exemplary embodiments.

FIG. 8 is a schematic diagram of a device 800 according to an exemplary embodiment. The device 800 may be any of the terminals described above. The device 800 can be implemented as a computing device such as a terminal device with a voice control function in the above embodiments of the present disclosure. The device 800 includes a central processing unit (CPU) 801, a system memory 804 including a random access memory (RAM) 802 and a read-only memory (ROM) 803, and a system bus 805 connecting the system memory 804 and the central processing unit 801. The device 800 further includes a basic input/output system (I/O system) 806 that helps information transfer between various devices in the device 800, and a large capacity storage device 807 which is used for storing an operating system 813, application programs 814, and other program modules 815.

The basic input/output system 806 includes a display 808 for displaying information and an input device 809 such as a mouse, a keyboard, or the like for a user to input information. The display 808 and the input device 809 are both connected to the central processing unit 801 through an input/output controller 810 connected to the system bus 805. The basic input/output system 806 may further include an input/output controller 810 for receiving and processing input from a plurality of other devices such as a keyboard, a mouse, or an electronic stylus. Similarly, the input/output controller 810 also provides outputs to a display screen, a printer, or other type of output devices.

The large capacity storage device 807 is connected to the central processing unit 801 through a large capacity storage controller (not shown) connected to the system bus 805. The large capacity storage device 807 and its associated computer-readable medium provide non-volatile storage for the device 800. The large capacity storage device 807 may include a computer-readable medium (not shown) such as a hard disk or a CD-ROM drive.

Generally, the computer-readable medium may include a computer storage medium and a communication medium. The computer storage medium includes volatile and non-volatile, removable and non-removable medium implemented in any method or technology for storage of information such as computer-readable instructions, data structures, program modules or other data. For example, the computer storage medium includes RAM, ROM. EPROM, EEPROM, flash memory or other solid-state storage technologies, CD-ROM, DVD or other optical storage device, tape cartridges, magnetic tape, disk storage or other magnetic storage devices. Those skilled in the art will know that the computer storage medium is not limited to the foregoing types. The above-mentioned system memory 804 and large capacity storage device 807 may be collectively referred to as a memory.

According to various embodiments of the present disclosure, the device 800 may also be operated by a remote computer connected to a network through a network such as the Internet. For example, the device 800 may be connected to the network 812 through the network interface unit 811 connected to the system bus 805, or the network interface unit 811 may be used to connect to other types of networks or remote computer systems (not shown).

The memory further includes one or more programs, the one or more programs are stored in the memory, and the central processing unit 801 executes the one or more programs to implement all or a part of the steps in the methods described above.

Those skilled in the art should be aware that in one or more of the above examples, the functions described may be implemented by hardware, software, firmware, or any combination thereof. When implemented in software, these functions may be stored in a computer-readable storage medium or transmitted as one or more instructions or code on a computer-readable medium. The computer-readable medium includes a computer storage medium and a communication medium including any medium that facilitates transfer of a computer program from one place to another. The storage medium may be any available medium that can be accessed by a general purpose or special purpose computer.

An embodiment of the present disclosure also provides a computer storage medium for storing computer software instructions used by the terminal, the instructions including programs to implement the key setting methods described above.

Other embodiments will be apparent to those skilled in the art from consideration of the specification and practice of the disclosure here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A key setting method performed by a terminal, wherein a pressure sensing area is provided on at least one side surface of the terminal with respect to a screen display region, the method comprising:

detecting a grip posture of a user gripping the terminal by using a touch sensor distributed on a surface of the terminal;

determining a key setting mode corresponding to the grip posture, wherein the key setting mode indicates functions of keys, wherein the keys are on a target side surface of the at least one side surface, wherein the target side surface is perpendicular to a surface where the screen display region is located, and determining the key setting mode corresponding to the grip posture comprises:

determining an application program running in a foreground in the terminal; and determining the key setting mode for the target side surface according to the application program running in the foreground and the grip posture; and setting a pressure sensing key corresponding to a key function in the pressure sensing area on the target side surface, wherein before determining the key setting mode corresponding to the grip posture, the method further comprises:

displaying a function setting interface corresponding to the key setting mode; and according to a function selection operation performed on the function setting interface, setting the key function corresponding to the target side surface.

2. The method according to claim 1, wherein setting a pressure sensing key corresponding to the key function in the pressure sensing area on the target side surface comprises:

obtaining a key position of the pressure sensing key corresponding to the key function; and according to the key position, setting the pressure sensing key in the pressure sensing area on the target side surface.

3. The method according to claim 2, wherein obtaining a key position of the pressure sensing key corresponding to the key function on the target side surface comprises at least one of:

obtaining the key position of the pressure sensing key corresponding to the key function on the target side surface as indicated by the key setting mode; or obtaining a touch region when the terminal is gripped, and determining the key position of the pressure sensing key corresponding to the key function on the target side surface according to a position of the touch region.

4. The method according to claim 1, wherein detecting a grip posture of a user gripping the terminal by using a touch sensor distributed on a surface of the terminal comprises:

obtaining a grip region when the terminal is gripped; and obtaining the grip posture according to the grip region.

5. The method according to claim 4, wherein obtaining the grip posture according to the touch region comprises:

searching for a grip region template matching the grip region; and obtaining the grip posture corresponding to the grip region template;

wherein the grip posture comprises at least one of a left-hand grip posture, a right-hand grip posture, or a two-hand grip posture.

6. The method according to claim 4, wherein the grip region comprises at least one touch region on a left side surface of the terminal and at least one touch region on a right side surface of the terminal, the left side surface is a side surface of the terminal located on the left of the screen display region, and the right side surface is a side surface of the terminal located on the right of the screen display region;
wherein obtaining the grip posture according to the grip region comprises:
comparing a number of at least one touch region on the left side surface with a number of at least one touch region on the right side surface;
if the number of at least one touch region on the left side surface is smaller than the number of at least one touch region on the right side surface, obtaining the grip posture as the left-hand grip posture; and
if the number of the at least one touch region on the right side surface is smaller than or equal to the number of the at least one touch region on the left side surface, obtaining the grip posture as the right-hand grip posture.

7. The method according to claim 1, wherein a display screen of the terminal comprises two main display regions, and the two main display regions face outward of the terminal along different directions respectively;
wherein before detecting a grip posture of a user gripping the terminal by using a touch sensor distributed on a surface of the terminal, the method further comprises:
obtaining touch regions respectively detected in the two main display regions; and
determining one of the two main display regions as the screen display region according to the touch regions respectively detected in the two main display regions.

8. A key setting device applied in a terminal, wherein a pressure sensing area is provided on at least one side surface of the terminal with respect to a screen display region, the device comprising:
a processor; and
a memory for storing instructions executable by the processor;
wherein the processor is configured to:
detect a grip posture of a user gripping the terminal by using a touch sensor distributed on a surface of the terminal;
determine a key setting mode corresponding to the grip posture, wherein the key setting mode indicates functions of keys, wherein the keys are on a target side surface of the at least one side surface, wherein the target side surface is perpendicular to a surface where the screen display region is located, and determining the key setting mode corresponding to the grip posture comprises:
determining an application program running in a foreground in the terminal; and
determining the key setting mode for the target side surface according to the application program running in the foreground and the grip posture; and
set, in the pressure sensing area on the target side surface, a pressure sensing key corresponding to a key function,
wherein before determining the key setting mode corresponding to the grip posture, the processor is further configured to:
display a function setting interface corresponding to the key setting mode; and
according to a function selection operation performed on the function setting interface, set the key function corresponding to the target side surface.

9. The device according to claim 8, wherein the processor is further configured to:
obtain a key position of the pressure sensing key corresponding to the key function; and
according to the key position, set the pressure sensing key in the pressure sensing area on the target side surface.

10. The device according to claim 9, wherein the processor is further configured to perform at least one of:
obtaining the key position of the pressure sensing key corresponding to the key function on the target side surface as indicated by the key setting mode; or
obtaining a touch region when the terminal is gripped, and determining the key position of the pressure sensing key corresponding to the key function on the target side surface according to a position of the touch region.

11. The device according to claim 8, wherein the processor is further configured to:
obtain a grip region when the terminal is gripped; and
obtain the grip posture according to the touch region.

12. The device according to claim 11, wherein the processor is further configured to:
search for a touch region template matching the touch region; and
obtain the grip posture corresponding to the touch region template;
wherein the grip posture comprises at least one of a left-hand grip posture, a right-hand grip posture, or a two-hand grip posture.

13. The device according to claim 11, wherein the grip region comprises at least one touch region on a left side surface of the terminal and at least one touch region on a right side surface of the terminal, the left side surface is a side surface of the terminal located on the left of the screen display region, and the right side surface is a side surface of the terminal located on the right of the screen display region;
wherein the processor is further configured to:
compare a number of at least one touch region on the left side surface with a number of at least one touch region on the right side surface;
if the number of at least one touch region on the left side surface is smaller than the number of at least one touch region on the right side surface, obtain the grip posture as the left-hand grip posture; and
if the number of the at least one touch region on the right side surface is smaller than or equal to the number of the at least one touch region on the left side surface, obtain the grip posture as the right-hand grip posture.

14. The device according to claim 8, wherein a display screen of the terminal comprises two main display regions, and the two main display regions face outward of the terminal along different directions respectively; and
wherein the processor is further configured to:
before detecting the grip posture of the user gripping the terminal by using the touch sensor distributed on the surface of the terminal, obtain touch regions respectively detected in the two main display regions; and
determine one of the two main display regions as the screen display region according to the touch regions respectively detected in the two main display regions.

15. A non-transitory computer-readable storage medium having stored therein instructions that, when executed by a processor in a terminal, cause the terminal to perform a key setting method, wherein a pressure sensing area is provided on at least one side surface of the terminal with respect to a screen display region, and the method comprises:
detecting a grip posture of a user gripping the terminal by using a touch sensor distributed on a surface of the terminal;
determining a key setting mode corresponding to the grip posture, wherein the key setting mode indicates functions of keys, wherein the keys are on a target side surface of the at least one side surface, wherein the target side surface is perpendicular to a surface where the screen display region is located, and determining the key setting mode corresponding to the grip posture comprises:
    determining an application program running in a foreground in the terminal; and
    determining the key setting mode for the target side surface according to the application program running in the foreground and the grip posture; and
setting a pressure sensing key corresponding to a key function in the pressure sensing area on the target side surface,
wherein before determining the key setting mode corresponding to the grip posture, the method further comprises:
displaying a function setting interface corresponding to the key setting mode; and
according to a function selection operation performed on the function setting interface, setting the key function corresponding to the target side surface.

* * * * *